(12) United States Patent
Dai et al.

(10) Patent No.: US 8,014,844 B2
(45) Date of Patent: Sep. 6, 2011

(54) ELECTROMAGNETIC SLIDING MECHANISM AND ELECTRONIC DEVICE

(75) Inventors: Way-Han Dai, Linkou Township, Taipei County (TW); Hsu-Chi Kao, Sindian (TW); Tsi-Yu Chuang, Beidou Township, Changhua County (TW); Chao-Yu Lee, Sijhih (TW); Ching-Hong Huang, Keelung (TW); Yi-Che Yang, Jhonghe (TW)

(73) Assignee: Chief Land Electronic Co., Ltd., Taipei, Hsien (TW)

( * ) Notice: Subject to any disclaimer, the term of this patent is extended or adjusted under 35 U.S.C. 154(b) by 511 days.

(21) Appl. No.: 12/289,810

(22) Filed: Nov. 5, 2008

(65) Prior Publication Data

US 2010/0113109 A1    May 6, 2010

(51) Int. Cl.
*H04M 1/00* (2006.01)
*H04M 1/02* (2006.01)
(52) U.S. Cl. .................................................. 455/575.4
(58) Field of Classification Search ............... 455/575.1, 455/575.4, 575.8
See application file for complete search history.

(56) References Cited

U.S. PATENT DOCUMENTS

2007/0254691 A1 * 11/2007 Lu ............................. 455/550.1

FOREIGN PATENT DOCUMENTS

KR          2005061864 A  *  6/2005

* cited by examiner

*Primary Examiner* — David Mis
(74) *Attorney, Agent, or Firm* — Rosenberg Klein & Lee

(57) ABSTRACT

An electromagnetic sliding mechanism and an electronic device are provided. The sliding mechanism includes a fixing base, a sliding piece, and an elastic piece. The fixing base and the sliding piece are respectively provided with an electromagnetic element and the two electromagnetic elements correspond to each other. The sliding piece can slide between a first position and a second position with respect to the fixing base. One end of the elastic piece is pivotally connected to the fixing base, and the other end thereof is pivotally connected to the sliding piece to slide synchronously therewith. Via a repulsive magnetic force generated by electro-magnetizing the two electromagnetic elements, the sliding piece slides automatically from the first position to the second position. When the electromagnetic sliding mechanism is applied to the electronic device, two opposite casings of the electronic device can slide with respect to each other.

12 Claims, 10 Drawing Sheets

ELECTROMAGNETIC SLIDING MECHANISM AND ELECTRONIC DEVICE

BACKGROUND OF THE INVENTION

1. Field of the Invention

The present invention relates to an electromagnetic sliding mechanism, and in particular to an electromagnetic sliding mechanism applicable to an electronic device, whereby two opposite casings of the electronic device can slid and be positioned with respect to each other automatically.

2. Description of Related Art

With regard to an electronic device having a cover (such as a mobile phone), the cover can generally be opened by two means of lifting or sliding. In a cover-sliding type mobile phone, the cover is able to slide with respect to the cover. That is to say, when opening or closing the cover, the user has to push the cover. With regard to most cover-sliding type mobile phones available in the market, the user has to push the cover manually. That is to say, when the user intends to use the mobile phone, the user has to push the cover of the mobile phone continuously until the cover reaches a predetermined position. Similarly, when the user intends to close the mobile phone, the user has to push the cover in a reverse direction so as return the cover to its original position. Therefore, when the user opens or closes the cover, the user has to apply a force to push the cover to the predetermined position, which is very inconvenient in use.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide an electromagnetic sliding mechanism, in which the cooperation between electromagnetic elements and an elastic piece can drive a sliding piece to slide automatically.

Another object of the present invention is to provide an electronic device, in which an electromagnetic sliding mechanism drives two opposite casings to slide to a proper position with each other automatically.

In order to achieve the above objects, the present invention provides an electromagnetic sliding mechanism, which includes a fixing base provided with at least one electromagnetic element; a sliding piece slidably provided at the fixing base and sliding between a first position close to the electromagnetic element of the fixing base and a second position away from the first position, the sliding piece being provided with at least one electromagnetic element corresponding to the electromagnetic element of the fixing base; and an elastic piece having a first end and a second end, the first end being pivotally connected to the fixing base, the second end being pivotally connected to the sliding piece and moving synchronously with the sliding piece; whereby after the electromagnetic element of the fixing base and the electromagnetic element of the sliding piece are electro-magnetized, a repulsive magnetic force larger than a resistant force of the elastic piece is generated between the electromagnetic element of the fixing base and the electromagnetic element of the sliding piece, so that the sliding piece automatically slides from the first position to the second position; after the connecting portion between the sliding piece and the second end of the elastic piece passes through the connecting portion between the fixing base and the first end of the elastic piece, the electromagnetic element of the fixing base and the electromagnetic element of the sliding piece are de-magnetized, the elastic piece then expands outwards to apply a thrust to the sliding piece for making the sliding piece to slide toward the second position continuously.

The present invention further provides an electronic device, which includes:

an electromagnetic sliding mechanism comprising: a fixing base provided with at least one electromagnetic element; a sliding piece slidably provided at the fixing base and sliding between a first position close to the electromagnetic element of the fixing base and a second position away from the first position, the sliding piece being provided with at least one electromagnetic element corresponding to the electromagnetic element of the fixing base; and an elastic piece having a first end and a second end, the first end being pivotally connected to the fixing base, the second end being pivotally connected to the sliding piece and moving synchronously with the sliding piece;

a first casing connected to the fixing base; and a second casing connected to the sliding piece and moving synchronously with the sliding piece.

The present invention has advantageous features as follows. The electromagnetic sliding mechanism of the present invention utilizes the change in magnetic properties between the electromagnetic elements respectively provided on the sliding piece and the fixing base and the special design of the elastic piece to thereby make the sliding piece to slide automatically. After the sliding piece is pushed to a predetermined position, the elastic piece provides a supporting force to thereby locate the sliding piece to the desired position. On the other hand, when the electromagnetic sliding mechanism is applied to the electronic device, two opposite casing of the electronic device can be made to slide to a predetermined position automatically, thereby increasing the convenience in use.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF PREFERRED EMBODIMENTS

Figure 1:
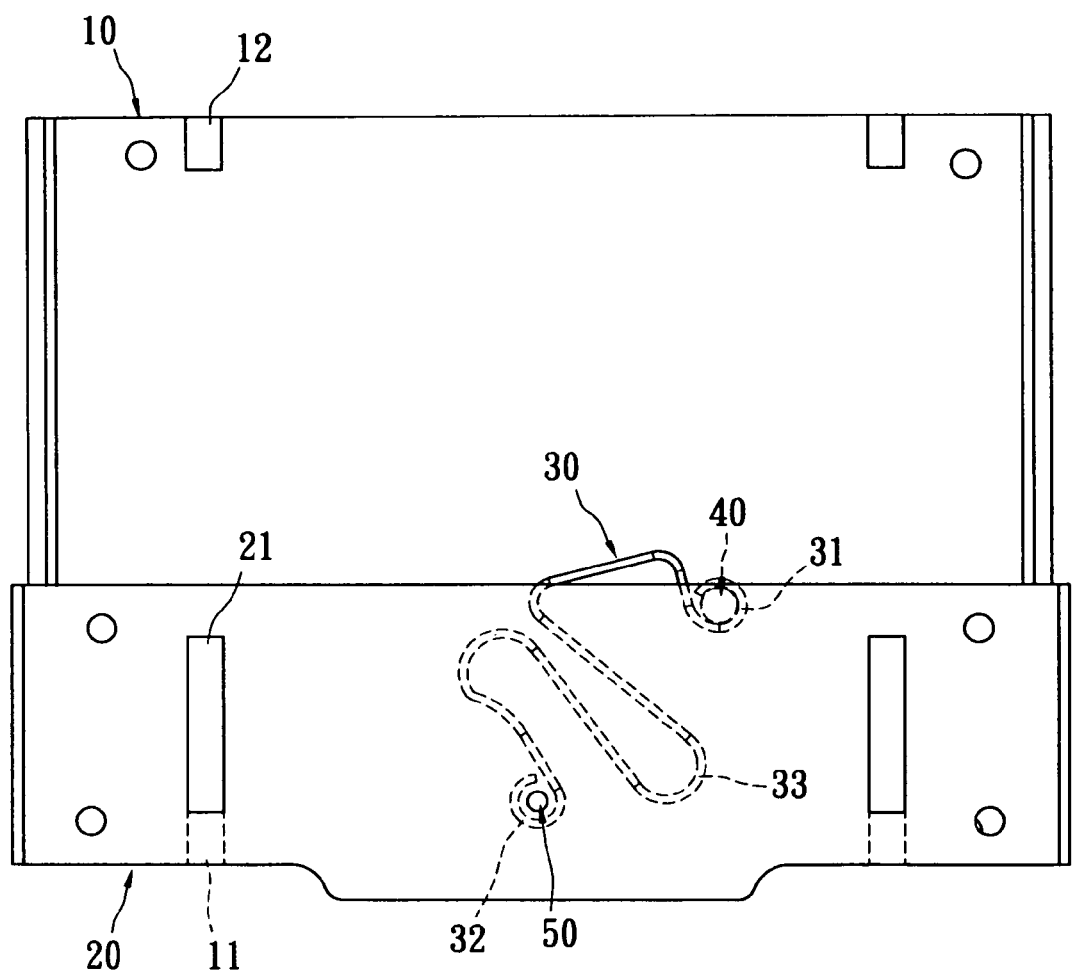
FIG. 1 is a schematic view (I) showing the action of the electromagnetic sliding mechanism of the present invention while the sliding piece is located in the first position.

Please refer to FIG. 1. The present invention provides an electromagnetic sliding mechanism 100, which includes a fixing base 10, a sliding piece 20, and an elastic piece 30. One side of the fixing base 10 is provided with at least one first electromagnetic element 11. The other side of the fixing base 10 away from the first electromagnetic element 11 is provided with at least one second electromagnetic element 12 (a.k.a. the further electromagnetic element of the fixing base). In the drawing, two first electromagnetic elements 11 and two second electromagnetic elements 12 are shown as an example.

The sliding piece 20 has at least one third electromagnetic element 21. Both ends of the third electromagnetic elements 21 correspond to the first electromagnetic element 11 and the second electromagnetic element 12 respectively. In the present embodiment, the first electromagnetic element 11 of the fixing base 10, the second electromagnetic element 12 of the fixing base 10, and the third electromagnetic element 13 of the sliding piece 20 are electromagnets. By means of electro-magnetizing, these electromagnets generate attractive or repulsive magnetic force with each other.

Figure 4:
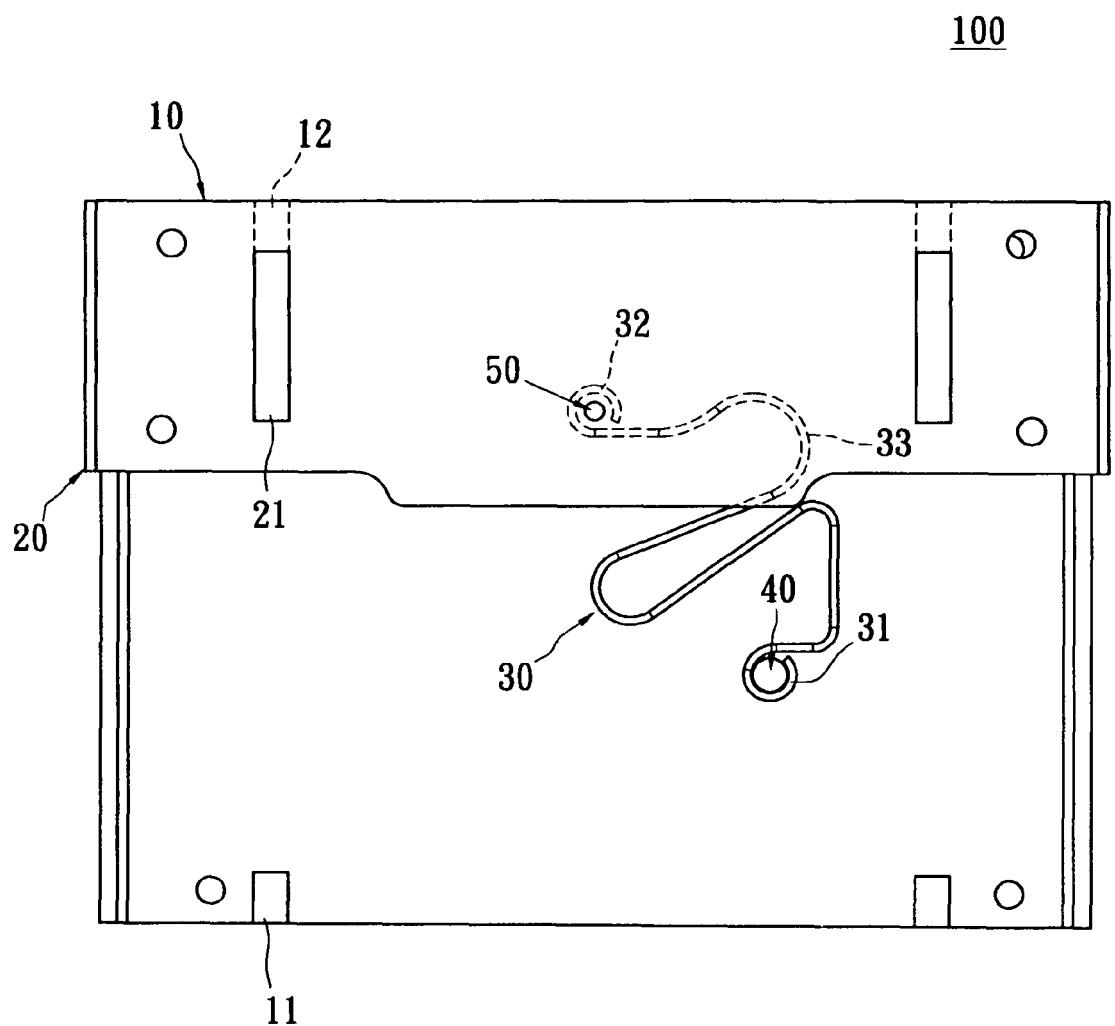
FIG. 4 is a schematic view (IV) showing the action of the electromagnetic sliding mechanism of the present invention while the sliding piece is located in the second position.

The sliding piece 20 is slidably provided above the fixing base 10 via tracks, grooves, or the like, so that the sliding piece 20 can slide between a first position (FIG. 1) and a second position (FIG. 4). The first position is close to the first electromagnetic element 11. The second position is away from the first position but close to the second electromagnetic element 12.

Figure 5:
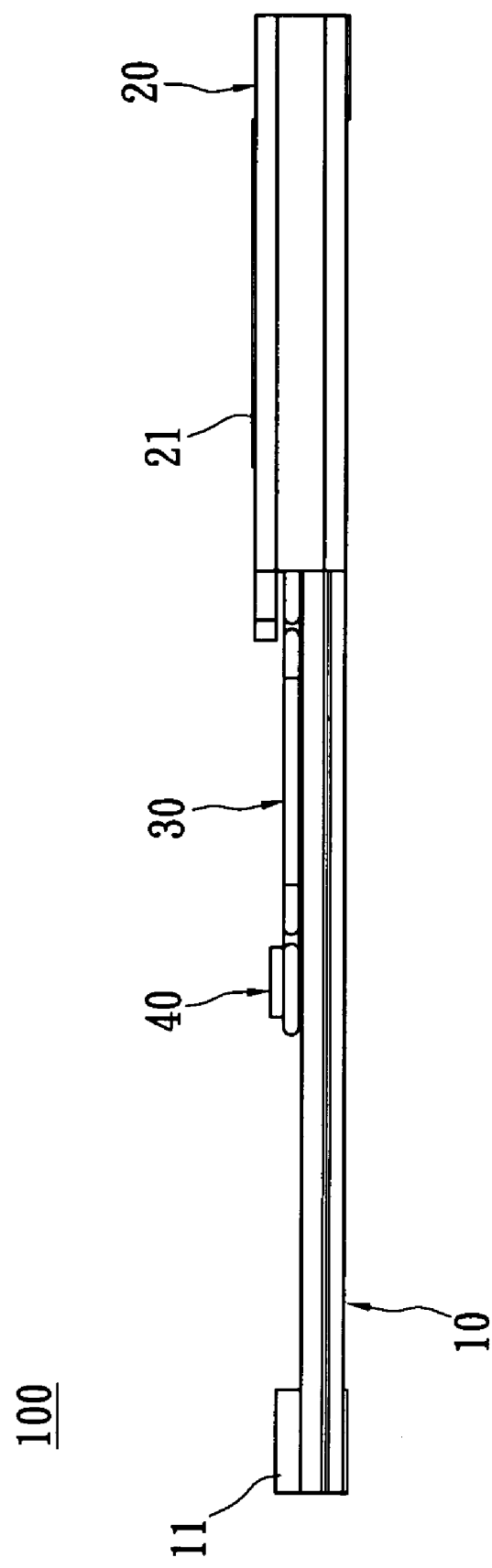
FIG. 5 is a side view of FIG. 4.

The elastic piece 30 is a spring. The spring is formed by means of bending a wire. The length of the wire is formed with a plurality of bending portions 33 that are distributed in a plane. The elastic piece 30 has a first end 31 and a second end 32. The first end 31 is pivotally connected to the fixing base 10 via a rivet 40 and is located between the first electromagnetic element 11 and the second electromagnetic element 12. The second end 32 is pivotally connected to the sliding piece 20 via a rivet 50 and slides synchronously with the sliding piece 20. In this way, the elastic piece 30 is provided between the fixing base 10 and the sliding piece 20 in an inclined orientation. Furthermore, as shown in FIG. 5, the sliding piece 20 and the fixing base 10 are located above and below the elastic piece 30 respectively, thereby forming a compact structure. Via the above arrangement, the electromagnetic sliding mechanism of the present invention can be formed.

Figure 2:
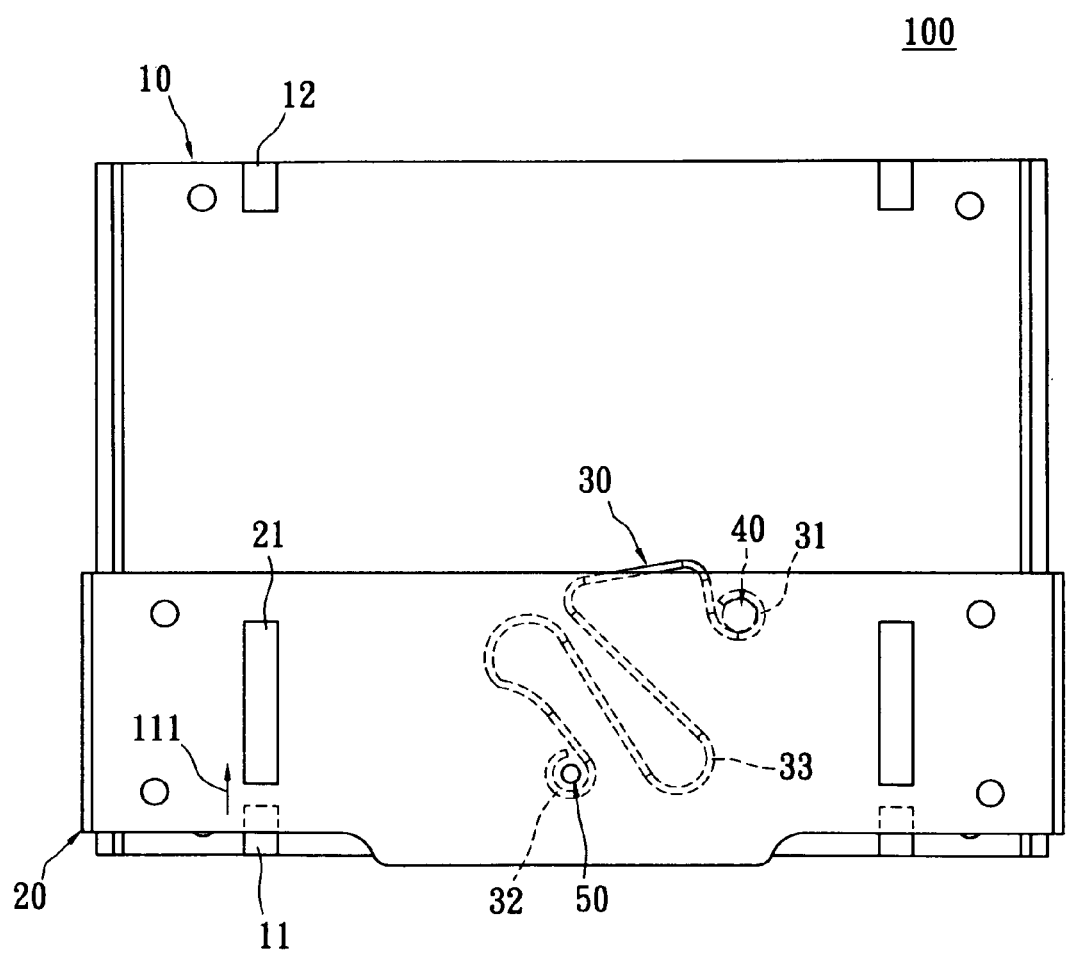
FIG. 2 is a schematic view (II) showing the action of the electromagnetic sliding mechanism of the present invention.

Please refer to FIG. 2; after the first electromagnetic element 11 and the third electromagnetic element 21 are electromagnetized, a repulsive magnetic force 111 is generated between the third electromagnetic element 21 of the sliding piece 20 and the first electromagnetic element 11 of the fixing base 10. The repulsive magnetic force 111 is larger than a resistant force of the elastic piece 30, so that the sliding piece 20 can move from the first position to the second position automatically while the bending portions 33 of the elastic piece 30 are compressed to store kinetic energy.

Figure 3:
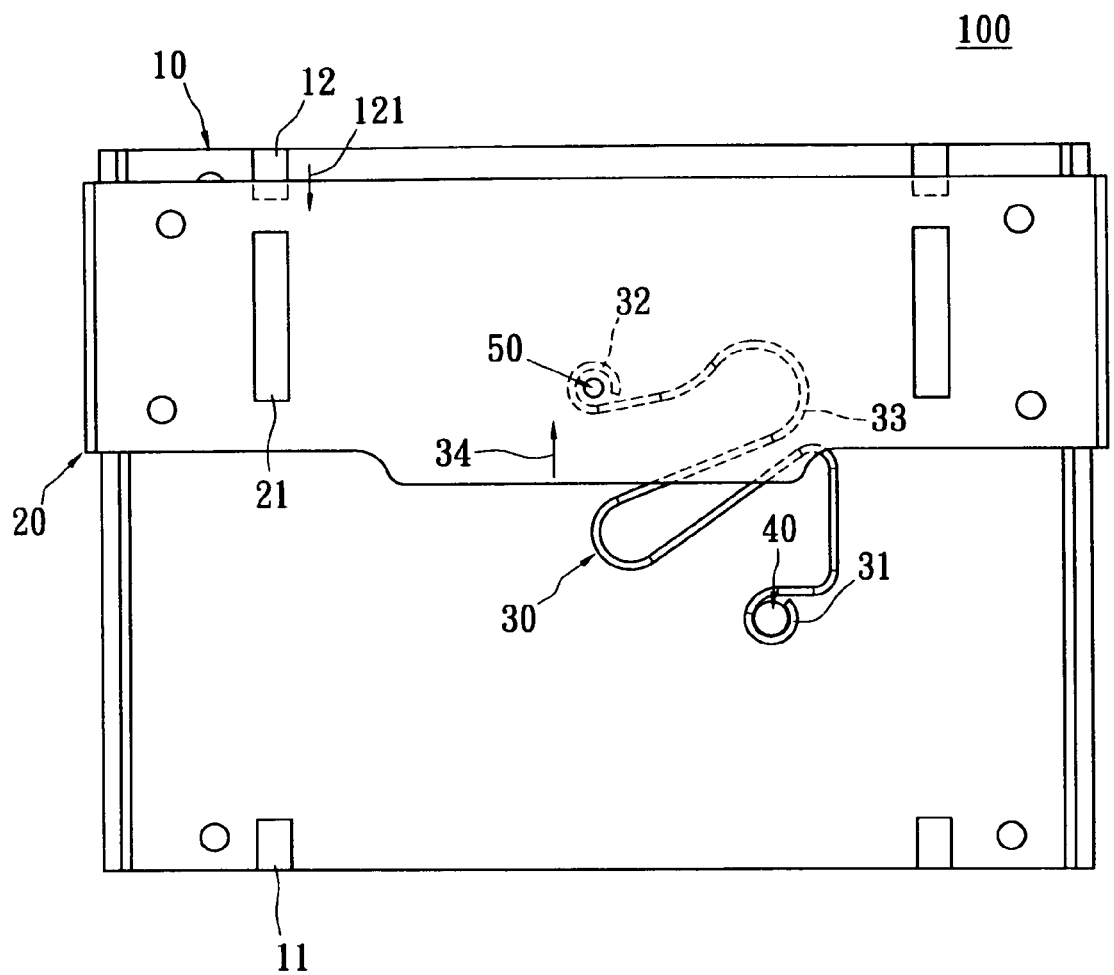
FIG. 3 is a schematic view (III) showing the action of the electromagnetic sliding mechanism of the present invention.

Please refer to FIG. 3. After the connecting portion between the sliding piece 20 and the second end 32 of the elastic piece 30 passes upwards through the connecting portion between the fixing base 10 and the first end 31 of the elastic piece 30, the first electromagnetic element 11 and the third electromagnetic element 21 are de-magnetized. The elastic piece 30 extends upwards to apply a thrust 34 for making the sliding piece 20 to slide toward the second position continuously.

Alternatively, when a repulsive magnetic force 111 is generated between the third electromagnetic element 21 of the sliding piece 20 and the first electromagnetic element 11 of the fixing base 10, the second electromagnetic element 12 of the fixing base 10 is further electro-magnetized, so that an attractive magnetic force (not shown) can be generated between the second electromagnetic element 12 and the third electromagnetic element 21, thereby attracting the sliding piece 20 to slide toward the second position.

When the sliding piece 20 reaches a certain distance in front of the second position, the magnetic property of the second electromagnetic element 12 of the fixing base 10 is changed again, so that a repulsive magnetic force 121 that is slightly smaller than the thrust 34 of the elastic piece 30 is generated between the second electromagnetic element 12 of the fixing base 10 and the third electromagnetic element 21 of the sliding piece 20, thereby providing a cushioning effect. In this way, the sliding piece 20 can stop at the second position slowly (FIGS. 4 and 5). Furthermore, after the sliding piece 20 stops at the second location, the elastic piece 30 provides a supporting force for the sliding piece 20, so that the sliding piece 20 keeps at the second position without moving.

Figure 6:
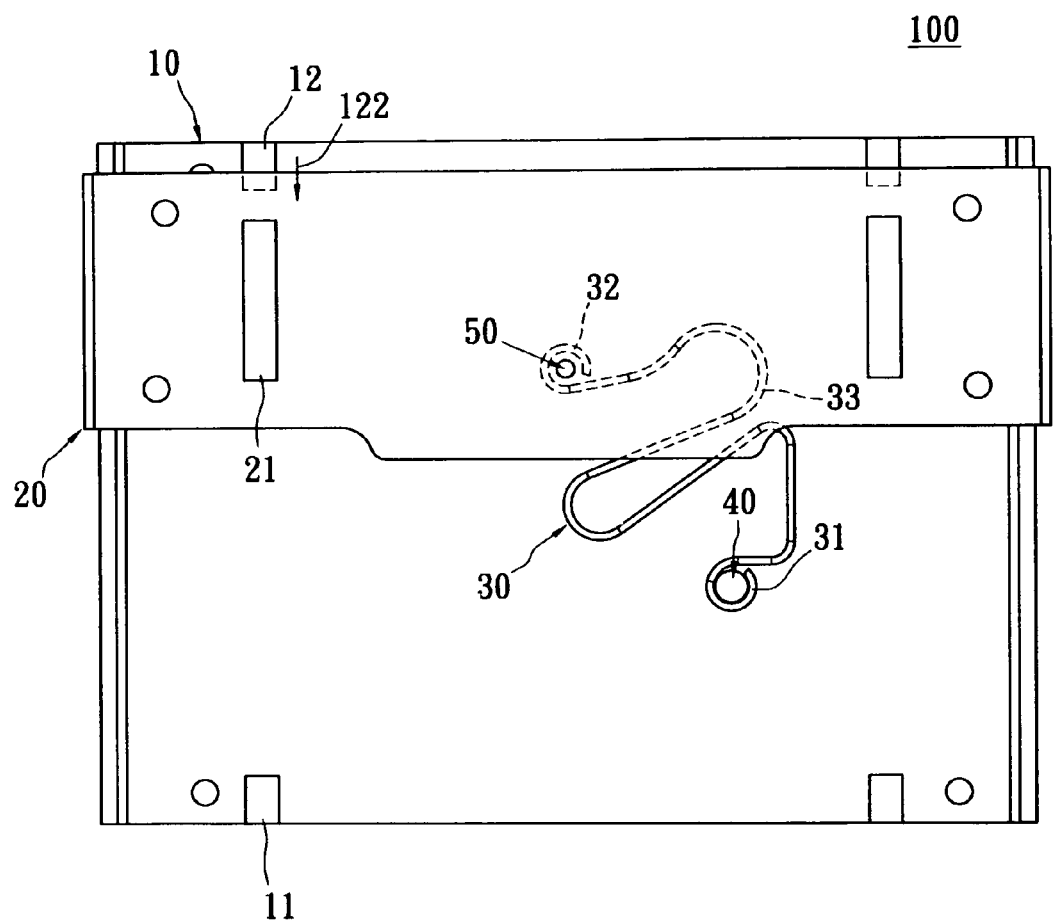
FIG. 6 is a schematic view (V) showing the action of the electromagnetic sliding mechanism of the present invention.

When the sliding piece 20 is to return to the first position from the second position, the principle of action is the same as the above. Please refer to FIG. 6. After the second electromagnetic element 12 and the third electromagnetic element 21 are electro-magnetized, a repulsive force 122 is generated between the third electromagnetic element 21 of the sliding piece 20 and the second electromagnetic element 12 of the fixing base 10. The thus-generated repulsive magnetic force 122 is larger than the resistant force of the elastic piece 30, so that the sliding piece 20 can move toward the first position automatically. As a result, the bending portions 33 of the elastic piece 30 are compressed to store kinetic energy.

Figure 7:
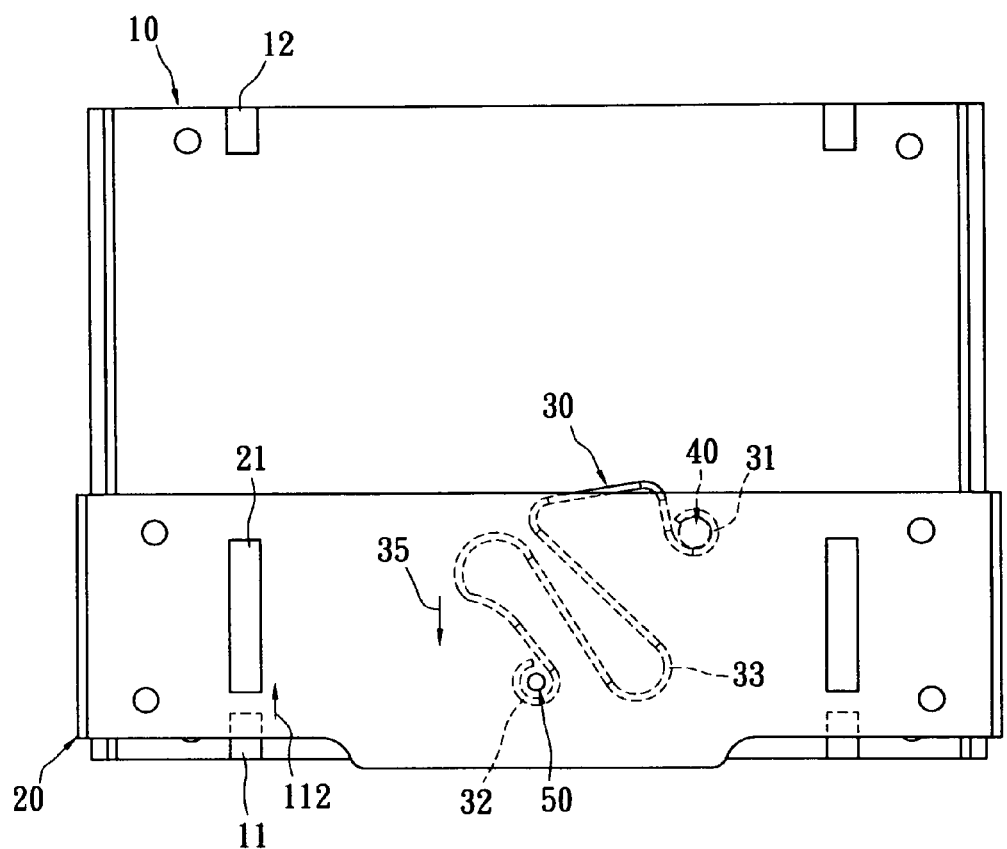
FIG. 7 is a schematic view (VI) showing the action of the electromagnetic sliding mechanism of the present invention.

Please refer to FIG. 7. After the connecting portion between the sliding piece 20 and the second end 32 of the elastic piece 30 passes downwards through the connecting portion between the fixing base 10 and the first end 31 of the elastic piece 30, the second electromagnetic element 12 and the third electromagnetic element 21 are de-energized. The elastic piece 30 expands downwards to apply a thrust 35 for making the sliding piece 20 to slide toward the first position continuously.

Alternatively, when the repulsive magnetic force 122 is generated between the third electromagnetic element 21 of the sliding piece 20 and the second electromagnetic element 12 of the fixing base 10, the first electromagnetic element 11 of the fixing base 10 can be electro-magnetized, so that an attractive magnetic force is generated between the first electromagnetic element 11 and the third electromagnetic element 21, thereby attracting the sliding piece 20 to slide toward the first position.

When the sliding piece 20 reaches a certain distance in front of the first position, the magnetic property of the first electromagnetic element 11 of the fixing base 10 is changed again, so that a repulsive magnetic force 112 which is slightly smaller than the thrust 35 of the elastic piece 30 is generated between the first electromagnetic element 11 and the third electromagnetic element 21 of the sliding piece 20, thereby providing a cushioning effect. In this way, the sliding piece 20 can stop at the first position slowly (as shown in FIG. 1). Furthermore, the elastic piece 30 also provides a force for supporting the sliding piece 20, thereby locating the sliding piece 20 in the first position.

Figure 8:
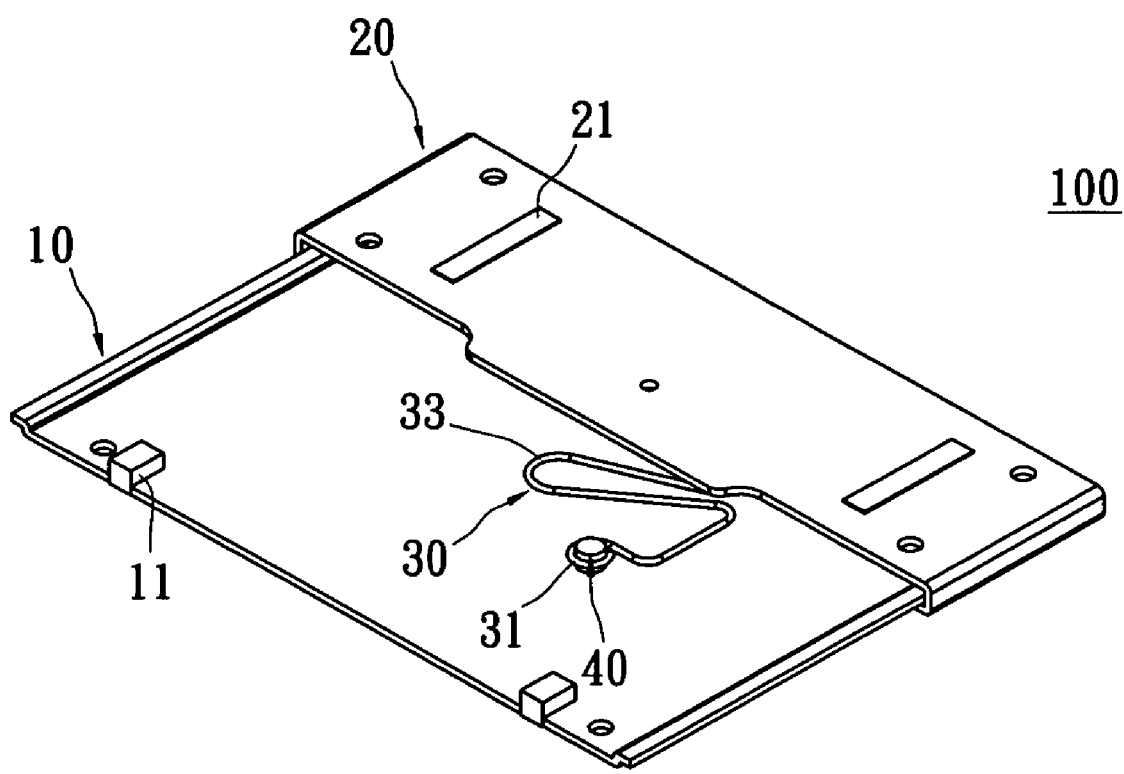
FIG. 8 is an assembled perspective view showing the magnetic sliding mechanism of the present invention.
Figure 9:
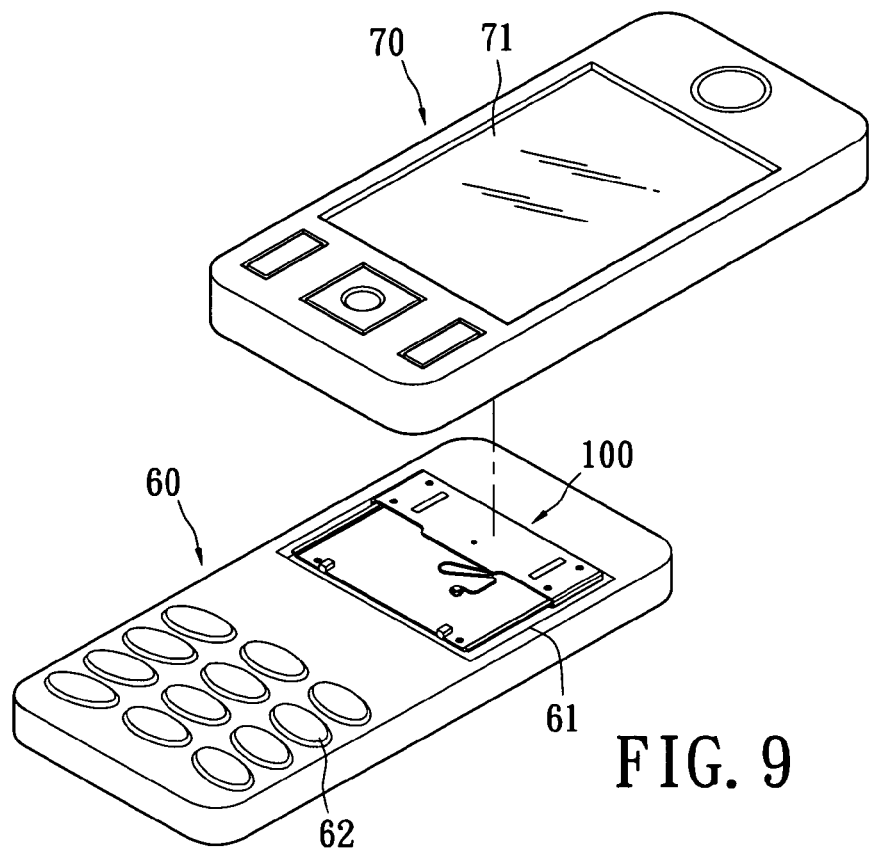
FIG. 9 is an exploded perspective view showing the electronic device of the present invention.

The aforementioned electromagnetic sliding mechanism 100 can be applied to various kinds of electronic devices such as mobile phone, personal digital assistant (PDA), or the like. Please refer to FIGS. 8 and 9. In these two figures, the electronic device is shown as a mobile phone, but it is not limited thereto. In addition to the electromagnetic sliding mechanism 100, the electronic device also includes a first casing 60 and a second casing 70.

In the present embodiment, the first casing 60 is a body in which a mounting trough 61 and a plurality of keys 62 are provided. The fixing base 10 is received in the mounting trough 61, and is connected to the first casing 60. The second casing 70 is a sliding cover that is connected to the sliding piece 20 and moves synchronously with the sliding piece 20. The sliding cover is provided with a screen 71.

Figure 10:
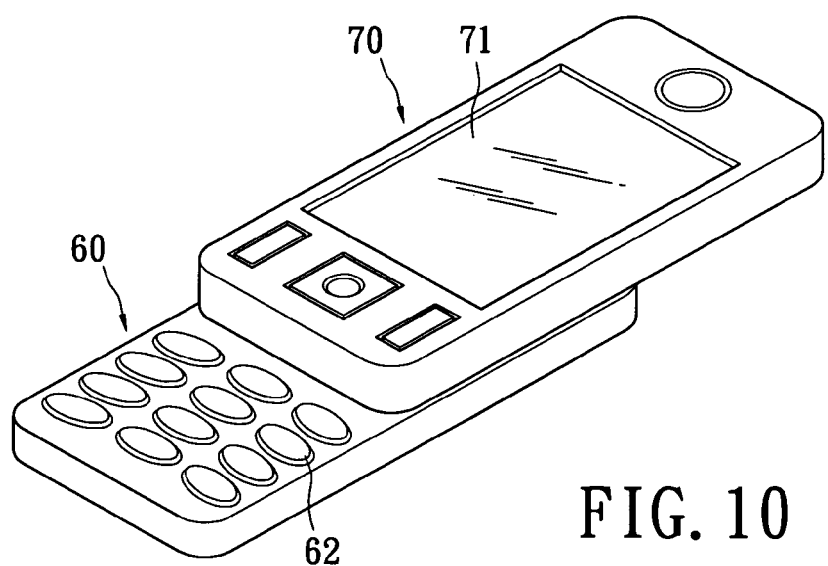
FIG. 10 is a perspective view showing the electronic device of the present invention extended.
Figure 11:
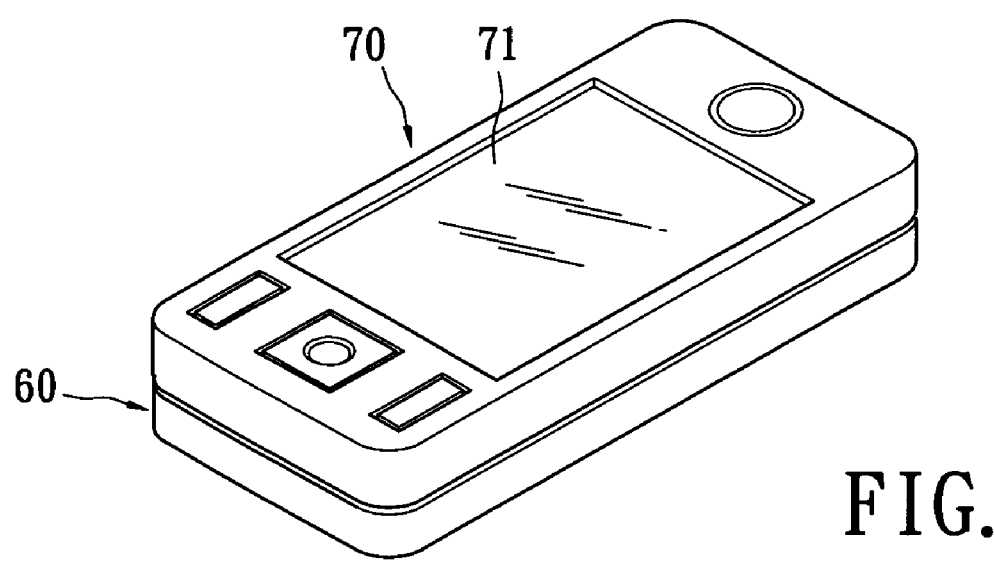
FIG. 11 is a perspective view showing the electronic device of the present invention retraced.

Thus, after the first electromagnetic element 11 and the third electromagnetic element 21 are electro-magnetized, the second casing 70 slides outwards together with the sliding piece 20, so that the second casing 70 is extended with respect to the first casing 60 and located in position. At this time, the screen 71 is opened and the keys 62 are exposed to the outside, so that the electronic device (i.e. the mobile phone) is ready to use (FIG. 10). After the second electromagnetic element 12 and the third electromagnetic element 21 are electro-magnetized, the second casing 70 slides inwards together with the sliding piece 20, so that the second casing 70 is retracted with respect to the first casing 60 and located in position. At this time, the screen 71 is closed, so that the electronic device (i.e. the mobile phone) turns into a standby state (FIG. 11). In other words, via the electromagnetic sliding mechanism 100, the second casing 70 electronic device can be extended or retracted automatically without pushing it manually.

Therefore, the present invention has advantageous features and effects as follows.

(I) The electromagnetic sliding mechanism of the present invention is provided with corresponding electromagnetic elements on the sliding piece and the fixing base respectively. By means of the change in magnetic properties caused by electro-magnetizing the electromagnetic elements and the elastic recovering force of the elastic piece connected to the sliding piece and the fixing base, the sliding piece can slide from the first position to the second position automatically (or from the second position to the first position) and located in position.

(II) When the electromagnetic sliding mechanism is applied to an electronic device having a first casing and a second casing, the second casing connected to the sliding piece can slide automatically with respect to the first casing connected to the fixing base and is located in position. It is unnecessary for the user to continuously push the second casing manually, thereby increasing the convenience in use.

(III) After the sliding piece slides a certain distance, the corresponding electromagnetic elements can be de-magnetized. With the elastic piece providing a thrust, the sliding piece can be pushed to a predetermined position continuously.

(IV) After the sliding piece is pushed to the predetermined position, the supporting force provided by the elastic piece is used to keep the sliding piece in position.

(V) Before the sliding piece reaches the predetermined position, a repulsive force that is slightly smaller than the elastic force of the elastic piece is generated by the corresponding electromagnetic elements, so that the sliding piece can stop at a desired position slowly, thereby providing a cushioning effect.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electromagnetic sliding mechanism, comprising:
a fixing base provided with at least one electromagnetic element;
a sliding piece slidably provided at the fixing base and sliding between a first position close to the electromagnetic element of the fixing base and a second position away from the first position, the sliding piece being provided with at least one electromagnetic element corresponding to the electromagnetic element of the fixing base; and
an elastic piece having a first end and a second end, the first end being pivotally connected to the fixing base, the second end being pivotally connected to the sliding piece and moving synchronously with the sliding piece;
whereby after the electromagnetic element of the fixing base and the electromagnetic element of the sliding piece are electro-magnetized, a magnetic repulsive force larger than a resistant force of the elastic piece is generated between the electromagnetic element of the fixing base and the electromagnetic element of the sliding piece, so that the sliding piece automatically slides from the first position to the second position; after the connecting portion between the sliding piece and the second end of the elastic piece passes through the connecting portion between the fixing base and the first end of the elastic piece, the electromagnetic element of the fixing piece and the electromagnetic element of the sliding piece are de-magnetized, the elastic piece then expands outwards to apply a thrust to the sliding piece for making the sliding piece to slide toward the second position continuously.

2. The electromagnetic sliding mechanism according to claim 1, wherein the fixing base is provided with at least one further electromagnetic element away from the electromagnetic element of the fixing base, the second position is close to the further electromagnetic element; when the sliding piece slides to near the second position, a repulsive magnetic force that is smaller than an expanding elastic force of the elastic piece in a direction opposite to the elastic force is generated between the electromagnetic element of the sliding piece and the further electromagnetic element of the fixing base, thereby making the sliding piece to stop at the second position slowly.

3. The electromagnetic sliding mechanism according to claim 2, wherein the elastic piece is a spring, the spring is formed by means of bending a wire, the length of the wire is formed with a plurality of bending portions that are distributed in a plane.

4. The electromagnetic sliding mechanism according to claim 3, wherein the electromagnetic element of the fixing base, the electromagnetic element of the sliding base, and the further electromagnetic element of the fixing base are electromagnets.

5. The electromagnetic sliding mechanism according to claim 1, wherein the elastic piece is a spring, the spring is formed by means of bending a wire, the length of the wire is formed with a plurality of bending portions that are distributed in a plane 6. The electromagnetic sliding mechanism according to claim 5, wherein the electromagnetic element of the fixing base, the electromagnetic element of the sliding piece, and the further electromagnetic element of the fixing base are electromagnets.

7. An electronic device, comprising:
an electromagnetic sliding mechanism having:
a fixing base provided with at least one electromagnetic element;
a sliding piece slidably provided at the fixing base and sliding between a first position close to the electromagnetic element of the fixing base and a second position away from the first position, the sliding piece being provided with at least one electromagnetic element corresponding to the electromagnetic element of the fixing base; and
an elastic piece having a first end and a second end, the first end being pivotally connected to the fixing base, the second end being pivotally connected to the sliding piece and moving synchronously with the sliding piece;
a first casing connected to the fixing base; and
a second casing connected to the sliding piece and moving synchronously with the sliding piece.

8. The electronic device according to claim 7, wherein the fixing base is provided with at least one further electromagnetic element away from the electromagnetic element of the fixing base, the second position is close to the further electromagnetic element; when the sliding piece slides to near the second position, a repulsive magnetic force that is smaller than an expanding elastic force of the elastic piece in a direction opposite to the elastic force is generated between the electromagnetic element of the sliding piece and the further electromagnetic element of the fixing base, thereby making the sliding piece to stop at the second position slowly.

9. The electronic device according to claim 8, wherein the elastic piece is a spring, the spring is formed by means of bending a wire, the length of the wire is formed with a plurality of bending portions that are distributed in a plane.

10. The electronic device according to claim 9, wherein the electromagnetic element of the fixing base, the electromagnetic element of the sliding piece, and the further electromagnetic element of the fixing base are electromagnets.

11. The electronic device according to claim 7, wherein the elastic piece is a spring, the spring is formed by means of bending a wire, the length of the wire is formed with a plurality of bending portions that are distributed in a plane 12. The electronic device according to claim 11, wherein the electromagnetic element of the fixing base, the electromagnetic element of the sliding piece, and the further electromagnetic element of the fixing base are electromagnets.

* * * * *